US012638298B2

(12) United States Patent
Wang et al.

(10) Patent No.: US 12,638,298 B2
(45) Date of Patent: May 26, 2026

(54) SYSTEM FOR VEHICLE RANGE ESTIMATION IN VIEW OF DRIVER SPECIFIC ENERGY USE

(71) Applicant: FCA US LLC, Auburn Hills, MI (US)

(72) Inventors: Chunjian Wang, Troy, MI (US); Drushan A Mavalankar, Rochester Hills, MI (US); Halim G Santoso, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 103 days.

(21) Appl. No.: 18/438,839

(22) Filed: Feb. 12, 2024

(65) Prior Publication Data

US 2025/0258007 A1      Aug. 14, 2025

(51) Int. Cl.
*G01C 21/34* (2006.01)
*G01C 21/36* (2006.01)

(52) U.S. Cl.
CPC ..... *G01C 21/3469* (2013.01); *G01C 21/3492* (2013.01); *G01C 21/3617* (2013.01); *G01C 21/3679* (2013.01)

(58) Field of Classification Search
CPC ............ G01C 21/3469; G01C 21/3492; G01C 21/3617; G01C 21/3679
See application file for complete search history.

(56) References Cited

U.S. PATENT DOCUMENTS

2023/0204369 A1 * 6/2023 Wang ................. G01C 21/3469
                                                    701/465
2023/0311684 A1 * 10/2023 Choi ...................... B60L 50/75

FOREIGN PATENT DOCUMENTS

WO      WO-2022122258 A1 * 6/2022 ......... G01C 21/3415

* cited by examiner

*Primary Examiner* — Joseph J Dallo
(74) *Attorney, Agent, or Firm* — Jeremy J. Klobucar

(57)      ABSTRACT

A method of providing route information to a driver, includes determining a travel path for a trip to a destination, determining segments of the travel path, determining a driving style of a driver of the vehicle, determining an energy use model for vehicle energy use along the travel path that is based in part on the driving style, estimating propulsion energy available in vehicle, and comparing the estimated propulsion energy to the energy use model to determine a need for adding propulsion energy to the vehicle before the vehicle reaches the destination. When additional propulsion energy is determined to be needed, the method includes determining a location of a propulsion energy station along the travel path and reachable by the vehicle as determined from the energy use model.

17 Claims, 2 Drawing Sheets

SYSTEM FOR VEHICLE RANGE ESTIMATION IN VIEW OF DRIVER SPECIFIC ENERGY USE

FIELD

The present disclosure relates to a system to estimate a vehicle range capability that is based at least in part on driver specific information.

BACKGROUND

Especially with electric vehicles, and because recharging a vehicle can take considerable time and recharging stations are not as prevalent as refueling stations for combustion engines, drivers can have concerns about the range of the electric vehicle. Vehicle range estimations based on nominal or average driving behavior are not sufficient to estimate the actual range more aggressive drivers will obtain. More aggressive drivers tend to consume more energy for a given trip and this may further vary as a function of the type of driving performed, where, for example and without limitation, aggressive drivers may consume a greater rate of energy in stop and go and similar driving conditions requiring frequent accelerations.

SUMMARY

In at least some implementations, a method of providing route information to a driver, includes determining a travel path for a trip to a destination, determining segments of the travel path, determining a driving style of a driver of the vehicle, determining an energy use model for vehicle energy use along the travel path that is based in part on the driving style, estimating propulsion energy available in vehicle, and comparing the estimated propulsion energy to the energy use model to determine a need for adding propulsion energy to the vehicle before the vehicle reaches the destination. When additional propulsion energy is determined to be needed, the method includes determining a location of a propulsion energy station along the travel path and reachable by the vehicle as determined from the energy use model.

In at least some implementations, the driving style is determined at least in part as a function of rate of acceleration by the driver on multiple travel path types. In at least some implementations, the travel path types include highways and city roads. In at least some implementations, the driving style is determined as a function of rate of deceleration of the driver. In at least some implementations, the segments of the travel path are categorized based on travel path type within each segment.

In at least some implementations, the driving style is determined from vehicle operation by the driver that occurred prior to the trip.

In at least some implementations, the energy use model is based at least in part on the energy consumption model of the vehicle, the driving style and the travel path type of each segment.

In at least some implementations, the propulsion energy available in the vehicle is estimated to include a buffer sufficient for the vehicle to travel at least 10 miles.

In at least some implementations, the driving style is determined as a function of a vehicle energy use history when the vehicle is operated by the driver and compared to a nominal energy use model for the vehicle in the same driving conditions.

In at least some implementations, the vehicle includes sensors responsive to vehicle dynamic parameters and the driving style determination is accomplished as a function of the output from the sensors.

In at least some implementations, the sensors include an accelerometer having an output indicative of vehicle accelerations and a speed sensor having an output indicative of vehicle speed.

In at least some implementations, the segments are categorized as a function of a speed limit on each road within the travel path.

In at least some implementations, the segments are categorized as a function of one or both of a number of intersections or stops on each road within the travel path.

In at least some implementations, the step of determining the driving style is accomplished by recording vehicle dynamic parameters while the driver is operating the vehicle and associating the vehicle dynamic parameters with a travel path type on which the vehicle was traveling when the vehicle dynamic parameters occurred.

In at least some implementations, the step of determining the driving style is accomplished as a function of an average rate of acceleration of the vehicle by the driver from a stopped state of the vehicle, or an average speed of the vehicle when driven by the driver compared to a speed limit for a road on which the vehicle is traveling, or both.

In at least some implementations, the energy use model is generated by adding up estimated energy use determinations for each segment.

In at least some implementations, the energy use model is generated at least in part as a function of an estimated traffic level in each segment when the vehicle is estimated to be traversing each segment, an estimated vehicle speed in each segment when the vehicle is estimated to be traversing each segment, a number of times the vehicle is estimated to have to stop in each segment, or a combination of two or more of these.

In at least some implementations, the driving style is determined for each of two or more travel path types.

In at least some implementations, a system for determining vehicle range for a vehicle, includes a supply of propulsion energy, a sensor responsive to the level of propulsion energy remaining in the supply, an accelerometer responsive to accelerations of the vehicle, a speed sensor responsive to a vehicle speed, a location sensor arranged to enable determination of the location of the vehicle as the vehicle is operated, and a control system. The control system includes a processor and a computer readable memory with instructions executable by the processor to record data from the accelerometer and from the speed sensor in use of the vehicle, to associate the data with location information from the location sensor, to store the data in categories as a function of the location information and a travel path type as determined from the location information, to determine an energy use model for the vehicle based on data from prior use of the vehicle by a driver of the vehicle, and to determine a vehicle range as a function of a travel path of the vehicle and at least in part based on the stored data and the level of propulsion energy remaining in the source.

In at least some implementations, the vehicle range is determined based on a nominal energy use model for the vehicle as modified by the data from prior use of the vehicle by the driver. In at least some implementations, the system includes a navigation program including information about travel path types within the travel path and from which the data from prior use of the vehicle by the driver can be associated with specific travel path types.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
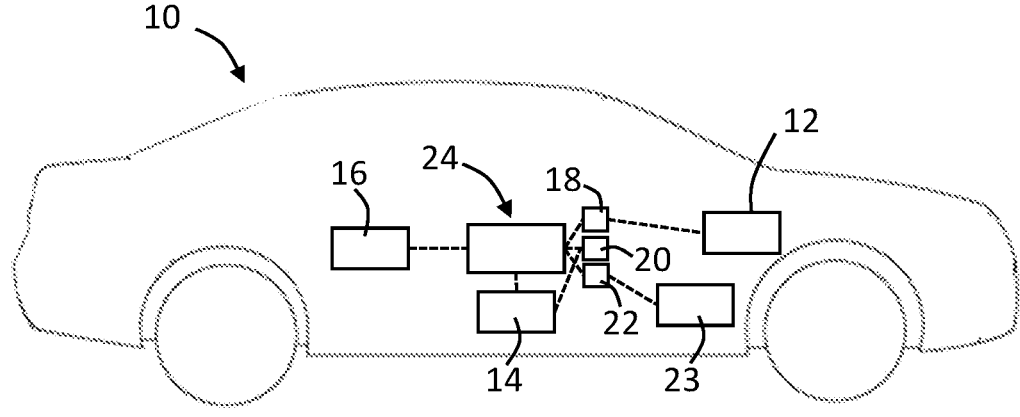
FIG. 1 is a perspective view of a vehicle including sensors and a control system.

Referring in more detail to the drawings, FIG. 1 illustrates a vehicle 10 that includes a prime mover 12 that may include a combustion engine, one or more electric motors or both an engine and motor(s), as in a hybrid vehicle 10. The vehicle 10 also includes a brake system 14 that functions to slow and stop the vehicle 10. In the example of a combustion engine or hybrid vehicle, a fuel tank may define all or part of a supply 16 of propulsion energy that may be used for propulsion of the vehicle 10. In an electric or hybrid vehicle, one or more batteries define at least part of the energy supply 16 in which electrical energy is stored to power a motor for vehicle propulsion. The vehicle 10 includes a throttle input 18 (e.g. accelerator pedal) and a brake input 20 (e.g. brake pedal) that allow driver controlled operation of the prime mover 12 and the brake system 14, and a steering input 22 (e.g. steering wheel or the like) that permits control of the vehicle direction via a suitable steering system 23. The throttle, braking and steering functions may also be done semi or fully autonomously, if desired.

To control various functions of the vehicle 10, the vehicle 10 has a control system 24, among other things, controls operation of the prime mover 12 of the vehicle 10. For example, the vehicle 10 may include drive by wire and brake by wire systems and the control system 24 may be programmed or include instructions to respond to driver action, such as movement of the throttle and brake inputs. The magnitude of the power output from the prime mover 12 and brake system 14 varies as a function of the driver operation of the throttle and brake inputs 18, 20, as well as the instructions executed by the control system 24, which may vary in different circumstances and may be implemented in view of variables and by way of look-up tables, maps, algorithms and the like.

To enable control and monitoring of various vehicle operating, environmental and other conditions related to vehicle operation, the control system 24 may include or be communicated with a range of sensors. By way of some examples, the vehicle 10 may include: a speed sensor 26 that provides an indication of vehicle speed; one or more accelerometers 30 responsive to vehicle accelerations in various directions and orientations; wheel speed sensors 32 responsive to the rotational speed of the vehicle wheels; drive input sensors (separate sensors, collectively referred to as 34) that sense the position and/or rate of movement of the throttle, brake and/or steering inputs 18, 20, 22, position or location sensors 36 or devices (such as GPS or the like) to determine the location of the vehicle; temperature sensors 38 for various things like ambient temperature, engine/motor temperature, battery temperature and the like; steering angle sensor 40 to enable determination of a vehicle steering angle; energy level sensors 42 like a fuel gauge or battery charge sensor that provide an indication of propulsion energy level remaining in the vehicle energy supply; and various other sensors that may be responsive to or useful in determining power output and/or energy consumption from the prime mover 12 (e.g. current draw of motors, or torque sensors).

In order to perform the functions and desired processing set forth herein, as well as the computations therefore, the control system 24 may include, but is not limited to, one or more controller(s), processor(s), computer(s) (generally referred to at 44), DSP(s), memory 46, storage, register(s), timing, interrupt(s), communication interface(s), and input/output signal interfaces, and the like, as well as combinations comprising at least one of the foregoing. For example, the control system 24 may include input signal processing and filtering to enable accurate sampling and conversion or acquisitions of such signals from communications interfaces and sensors. As used herein the terms control system 24 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 24 may be distributed among different vehicle modules, such as an infotainment control module, engine control module or unit, powertrain control module, transmission control module, and the like, if desired, and the memory and one or more processors may be one or both integrated into the vehicle 10 or remotely located and wirelessly communicated to the vehicle 10, as desired.

The term "memory" or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system and/or instructions executable by a processor or controller or the like to enable control or allocate resources of a computing device.

Figure 2:
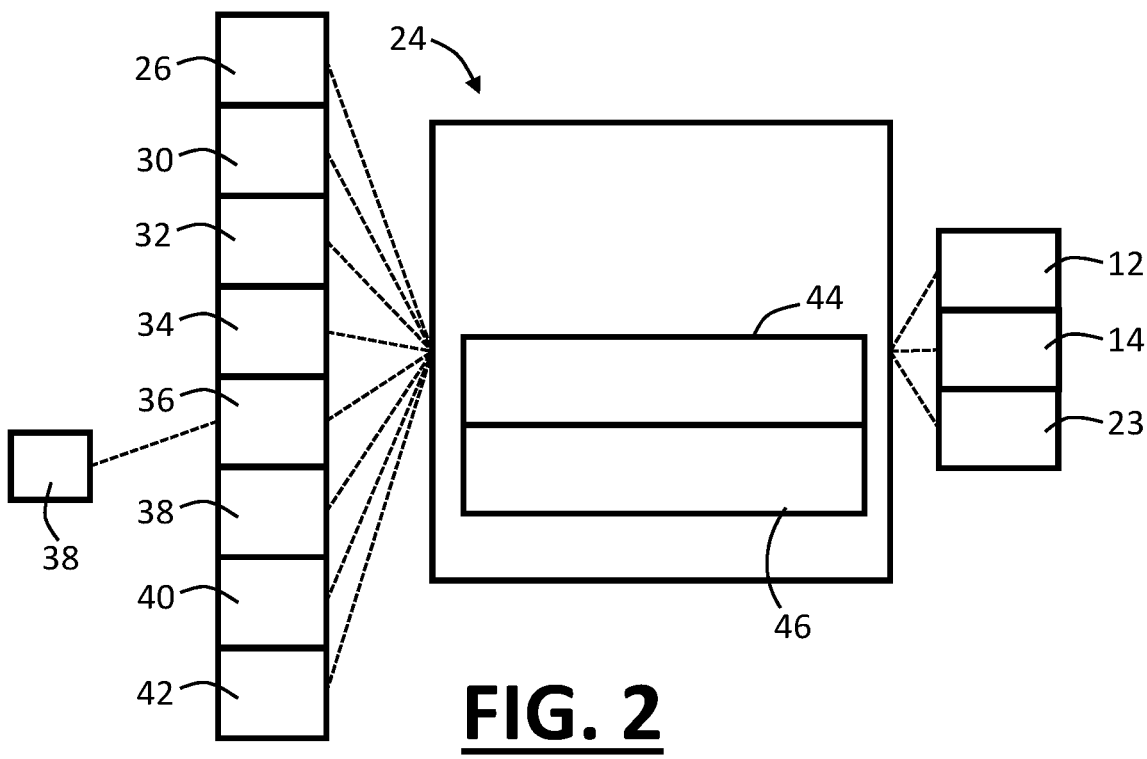
FIG. 2 is a diagrammatic view of the control system.

Various navigation programs 48 (FIG. 2) are known that compute a travel path to a destination, and convey information about the travel path to a driver in the form of visual and/or audible instructions for navigating the vehicle along the travel path. The navigation programs can use information from the location sensor 36 (e.g. GPS) and map data and information relating to road conditions and traffic (such as is available from Waze, GoogleMaps and other applications and sources). This information can be used to define travel paths that are shortest in total distance or time, or that avoid certain road types (e.g. not paved, toll roads, etc) or areas where travel time is less certain, for example, construction zones. The navigation programs 48 may be integrated into the vehicle control system 24 or infotainment system (which may be considered part of the control system), and/or can be resident on a mobile device that is connected to the vehicle 10 by wired or wireless connection.

Navigation programs may use data from numerous tracked vehicles currently traveling along, or that previously traveled along, roads within the travel path to provide crowd-sourced instantaneous and historical information about timing/duration of traffic patterns, average vehicle speeds by road, portions of roads, time of day, day of week, time of year, and the like. From this bulk information provided from many vehicles, the navigation programs can compare different route options that may be used in the travel path, and an estimated total time of travel can be provided, usually in the form of an estimated time of arrival at the chosen destination that is based on travel times and parameters along the entire travel path.

The travel path may include different types of roads, like city roads, rural roads, highways or other higher speed roads, that have different road conditions like speed limits, construction zones, intersections and stopping points which may be defined by traffic signs or traffic lights, for example. In addition to road conditions, the roads may have traffic levels that vary over time and may reduce travel speed as well as the number of stopping, braking and acceleration events when traveling on a road at a given time. Such variables and factors can affect the travel time and may affect the route chosen for the travel path to avoid, for examples, high traffic areas where travel will be slower.

The navigation information and the estimates of time to traverse the entire travel path, and various portions of segments of the travel path, can be less relevant to at least some drivers based on the driving habits of individual drivers. Similar, vehicle range capability (miles that can be traveled on current fuel or energy level in the vehicle 10) can vary considerably based on driving habits. Different rates of accelerations and traveling at different speeds, among other factors, can vary the energy consumption of a vehicle 10. People who drive less aggressively and/or at slower speeds may take longer to move along a travel path and arrive later than estimated by a navigation program. And such people may consume less energy and be able to travel further for a given vehicle energy level such that range estimations suggest unnecessary refueling or recharging iterations. Conversely, people who drive more aggressively and/or at faster speeds may take less time to move along a travel path and arrive earlier than estimated by a navigation program. And such people may consume more energy and be able to travel less distance for a given vehicle energy level such that range estimations do not accurately reflect needed refueling or recharging iterations. In this example, planning a trip to ensure adequate opportunities for refueling or recharging is difficult.

The systems and methods disclosed herein enable, among other things, driver specific driving habits and styles to be determined over a wide range of driving situations and vehicle operating parameters, and, among other things, facilitate accurate vehicle range determinations and travel path guidance. In at least some implementations, the control system 24 is enabled to track dynamic parameters during vehicle operation and to associate those dynamic parameters with particular driving scenarios, for later comparison with similar driving scenarios to be encountered later. Data from multiple sensors may be stored by the control system and grouped into different categories to enable a refined view of a driver's habits or style of driving. The data may be analyzed by a machine learning algorithm arranged to review historical data to provide an estimated energy use model for the driver along a given segment of a trip and up to the entire trip.

In at least some implementations, the system may use an initial operating period that can be set by the manufacturer or chosen by an individual. In this initial operating period, the control system 24 collects data from various sensors, such as those noted above, and associates or correlates the collected data with one or more environmental parameters and with the driver of the vehicle 10. In this initial operating period, the control system 24 is learning the driver habits over a range of operating conditions and scenarios so that various conditions and driving scenarios can be differentiated from others to improve the accuracy of data.

In at least some implementations, the control system 24 tracks data as a function of and may associate data with different categories, such as, but not limited to, travel path types which may include (but are not limited to) highway, city and rural. Within each category of travel path types, different variables may be tracked to permit differentiation from different conditions within a category. For example, for highways representative variables may be tracked such as number of lanes, speed limit, number of onramps and offramps, grade or steepness, etc. Thus, 2-lane highways, with one lane for traffic in each of two opposite directions, can be differentiated from highways with more lanes in each direction of traffic, and uphill sections can be differentiated from flat or downhill sections as energy consumption of the vehicle is different in these different sections of road. Similar differentiation can occur for the different variables tracked by the system within each category. Representative variables for city driving might include number of lanes for different roads, speed limits, traffic patterns, number/frequency of traffic signals like stoplights or stop signs, number/frequency of intersections, road grade, road surface type, etc. Rural driving variables may be similar to city driving, and may have higher speed limits and less traffic and fewer intersections and traffic signs.

In the various travel path types, various vehicle dynamics may be tracked and associated with the different travel path types and with the driver. In this way, the system can detect and learn driving style conditions particular to the driver. Such driving style conditions include, for example, average speed relative to speed limits or other vehicles on various types of roads, and this may be done for roads at which the driver may proceed at a generally constant speed, like during highway or rural driving, as well as during start and stop driving such as along city roads or in traffic. Environmental conditions can also be tracked and data associated therewith. For example, time of day (e.g. day driving vs. night driving), ambient temperature, condition of roads (e.g. wet or icy or unpaved roads vs. dry and paved roads), and other environmental variables can be determined and tracked during vehicle use.

Further, the driver's tendencies relating to rate of acceleration, rate of deceleration/braking, and rate at which various turns are navigated (e.g. turns of differing radius/severity) can be determined in different scenarios and associated with the corresponding travel path types and environmental factors to enable better prediction of future driving performance in similar conditions. For example, with both combustion engines and electric motors, a greater and not linear rate of energy often is used to accelerate the vehicle 10 more rapidly than more slowly. So, in general terms and other variables being the same, a driver who regularly accelerates the vehicle 10 more rapidly uses more energy to travel a given distance than does a driver who regularly accelerates more slowly.

Further, in electric and hybrid-electric vehicles, regenerative braking strategies may be used to charge vehicle batteries and improve vehicle range. A driver who brakes and decelerates the vehicle 10 more rapidly can provide a lower regenerative braking energy recover than a driver who brakes/decelerates over a greater distance and time. These are representative and not limiting examples of how driver habits and style of operating the vehicle 10 can affect energy use and efficiency.

When a learning phase is used, not all conditions may be encountered during the learning phase. For driving conditions not yet encountered by the driver in the vehicle 10, the system may use bulk data related to many other drivers, such as with current navigation systems, and/or the system may assign a driving type or rating to the driver. Such a type or rating may be based on the driver's actions in other driving conditions, and the system use that type or rating to estimate how the driver will operate the vehicle 10 in the not yet encountered driving condition. The driving type may be a value or range of values indicating a determined position of the driver on a scale from most aggressive/fast driving habits to least aggressive/slowest driving habits. That is, a particular level of aggressive driving and speed that is determined for one travel path type can be used to estimate how the driver would operate the vehicle 10 on a different travel path type.

As another example, a driver may be determined to use a certain amount of energy above a standard or threshold level in certain conditions and that differential may be used to estimate the energy the driver will use in different conditions. For example, if the driver uses 10% more energy, on average, than a nominal vehicle energy use model, the system can project that the driver will use 10% more energy than the nominal model in situations and conditions not yet encountered. After a situation is encountered by the driver, the system can store data generated during such vehicle operation and use that data in future trips. Thus, the system can continually update the driver data as the driver operates the vehicle 10, and a specific learning period is not needed. That is, the system can estimate driver habits and usage when driver specific data is lacking, and provide initial estimations based on a more generalized score or rating for the driver, based on information then available. This estimation is still based on driver specific data and takes into account general driving style or habits of the driver. In at least some implementations, no initial driving period is needed and the system provides estimations of driving behavior based on driver actions taken so far, and continues to refine the estimations as new data is collected and stored, as noted herein.

As the driver operates the vehicle 10 in more conditions, more information is obtained and the instances of generating estimations that are based on other driving conditions (e.g. not the same as the driving condition for which the estimation is made) is reduced. Further, with more data for each driving condition or type the accuracy of the estimations will improve as the driver's style and habits become better known. By way of examples, drivers may accelerate differently from a stopped state, or from a lower speed than a higher speed, for example, and may brake differently at different speeds and on different roads. So while determining that the driver tends to accelerate faster than nominal in some situation can be useful, that doesn't necessarily mean that the driver accelerates faster or at the determined rate in other driving situations, and the estimations and models determined herein become more refined and improved with more data recorded over time.

From this information, the driving style and habits of the driver can be determined over a wide range of conditions.

This information can be used to better determine information about a travel path for the driver. To do this, the vehicle destination is provided by the driver and the system then uses a navigation program to determine one or more routes to the destination. The trip information includes data about the selected travel path. This data may include types of roads (travel path types) and road conditions for each portion of the travel path, as well as traffic, weather, speed limits, and other information relevant to energy and time needed for the trip, such as likely stopping and acceleration events. The trip information may also include the locations of refueling or recharging stations along the travel path, where such information is now commonly available in some navigation and mapping programs.

From the trip information, the control system 24 may determine, among other things, an energy level needed to complete the trip. The energy level may be determined as a function of the driver's habits and driving style on various travel path types and in various conditions that may or will occur along the path of travel. The energy level needed for the trip can be broken down into segments of the trip, and the energy available in the vehicle 10 can be compared to the energy requirements for segments of the trip. In at least some implementations, the energy use model for a trip is generated at least in part as a function of an estimated traffic level in each segment when (e.g. at the time when) the vehicle 10 is estimated to be traversing each segment, an estimated vehicle speed in each segment when the vehicle 10 is estimated to be traversing each segment, a number of times the vehicle 10 is estimated to have to stop in each segment, or a combination of two or more of these.

Where the energy available in the vehicle 10 is not sufficient to complete the trip, with some factor of safety or buffer optionally provided, the system can determine where along the travel path the driver can stop to refuel or recharge the vehicle 10. In this determination, the distance of the refueling or recharging station from the travel path can be a variable, with less distance off the path being preferred as this may permit the trip to be completed in less time and with less energy use than if a farther away station is chosen. Determination that sufficient energy does not remain in the vehicle 10 to complete the trip, and finding best option(s) for refueling or recharging, can avoid, for example, a situation where the driver proceeds to a portion of the travel path in which refueling or recharging options on or close to the travel path are not located within reach of the vehicle 10. In this case, the vehicle 10 could be driven until it runs out of fuel/energy, or the driver must take the vehicle 10 further off the travel path to locate a reachable refueling or recharging station before the vehicle 10 runs out of available energy for propulsion. This can increase the duration of the trip, increase the total energy consumed on the trip, and cause frustration and inconvenience to the driver.

Figure 3:
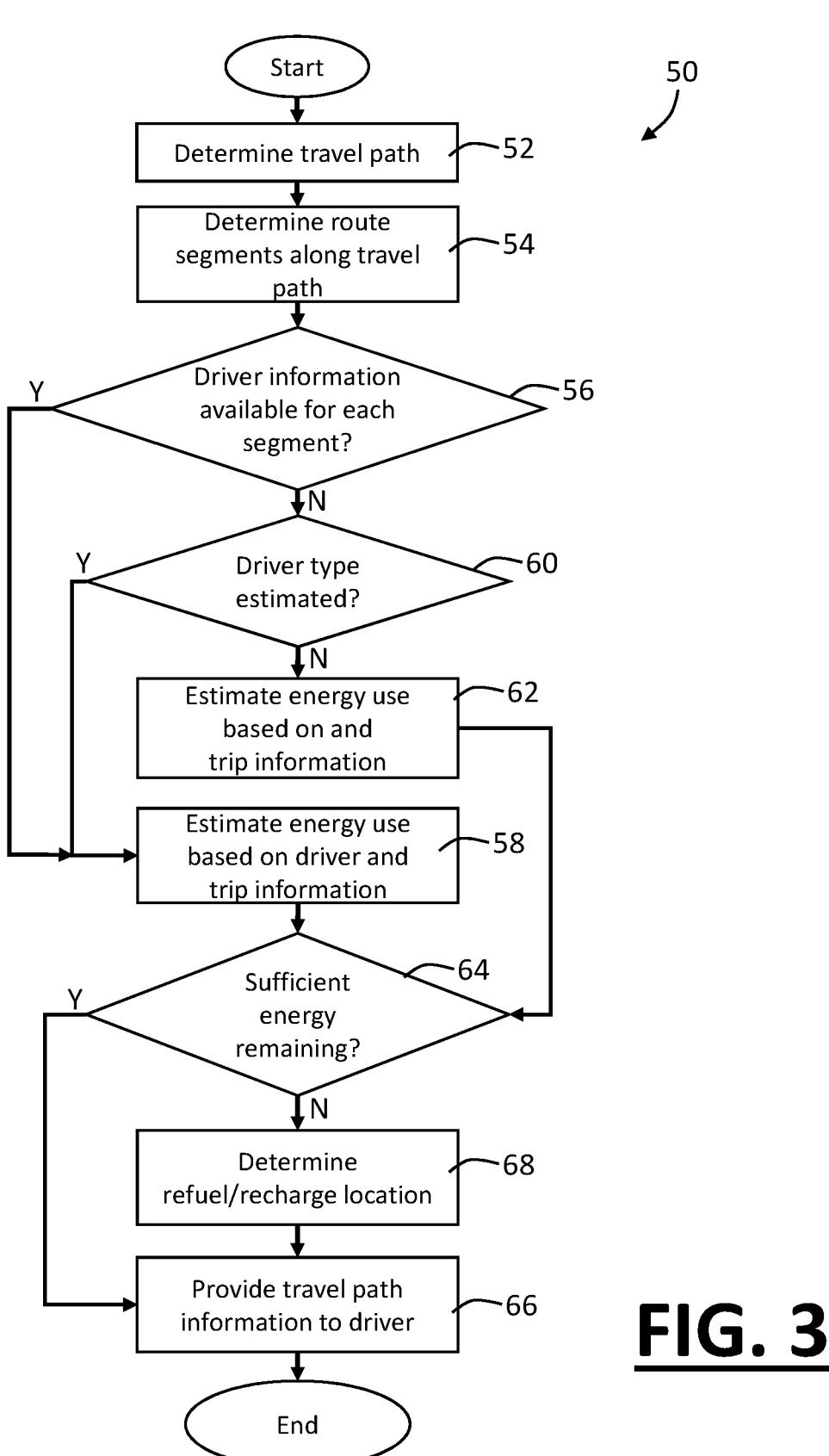
FIG. 3 is a flowchart of a method for determining vehicle range based on driver specific information.

In the example method 50 of FIG. 3, when the destination and travel path are determined in step 52, the travel path can, in at least some implementations, be divided in step 54 into segments based on different criteria. The segments may be defined by time duration (e.g. time intervals), or different travel path types, or based upon navigation instructions. For example, the portion of the travel path that involves a first road may be a first segment. And the portion of the travel path that involves a second road, that the vehicle 10 will turn onto after completing the first segment, may be a second segment, and so on. Specific or discrete segments need not be determined, and in at least some implementations, the method 50 may consider the entire travel path as a whole and not in segments.

With the travel path, or segments thereof, determined the method 50 continues to step 56 in which it is determined if sufficient driver specific information is known for each segment or the entire travel path. This determination may be made based on historical data obtained during driver operation of the vehicle 10 on the same or sufficient similar roads as in the travel path, where sufficient similar means that the roads are within the same category in the data collected by the system, as noted above. If driver-related information is available for the travel path/segments, then the method 50 continues to step 58 in which the energy usage for the vehicle 10 to complete the travel path and/or each segment or groups of segments is determined, based on the driver specific information (driver's habits and driving style). This can be termed an energy use model for the trip, based at least in part on the specific roads to be traveled and the driver operating the vehicle 10.

If driver-related information is not available for any or all of the travel path, then the method 50 may continue to step 60. In step 60, it is determined if a driving style or type has been estimated/established for the driver overall (relative aggressiveness, average speed compared to others or to speed limits, etc) or for similar conditions as will be encountered in the portion of the travel path for which driver-specific data is not currently available. If so, then the method 50 may proceed to step 58 and the energy use model for the travel path can be determined based on both trip information and the driver information, where the driver information may be based on specific driver data or driver type or both. If no driver/driving type has been estimated/established for any part of the travel path, then the method 50 may continue to step 62 in which a standard or "normal" energy use model may be determined based on the vehicle type and performance on different roads and at different speeds (e.g. a nominal or baseline fuel or energy use model for the vehicle 10, where different vehicles consume more or less energy in different driving conditions).

Further, with the nominal or baseline vehicle energy use model or characteristics known (e.g. a miles per gallon rating or miles per energy unit rating) the driving style or driver rating may be determined as a function of a vehicle energy use history when the vehicle 10 is operated by the driver (so vehicle use specific to the driver) and compared to a nominal energy use model (predetermined average energy use or rating) for the vehicle 10 in the same driving conditions. This may enable an adjustment factor or the like to be applied to the nominals energy use model to arrive at a driver-specific energy use model for one or more segments and up to the entire travel path.

From both steps 58 and 62, the method 50 may continue to step 64 in which the total propulsion energy available/remaining in the vehicle 10 (e.g. range estimations based on fuel level or battery charge level) is compared to the estimated energy required to complete the trip along the travel path. In at least some implementations, the energy use model is generated by adding up estimated energy use determinations for each segment of the travel path to provide an estimated total energy use for the trip.

If the energy available is sufficient to complete the trip, the method 50 may continue to step 66 in which the travel path information is provided to the driver (e.g. via the vehicle infotainment system or other navigation interface). If the energy available is not sufficient to complete the trip (e.g. the estimated vehicle range for the driver is less than the remaining distance to the destination, which may include a buffer of say 10 to 50 miles), the method 50 may continue to step 68 in which the location of optimal or preferred refueling or recharging stations are determined and one or more stations are selected and added to the travel path. In this way, the driver can be alerted of the need to refuel/recharge, and a convenient refueling station can be selected in view of the energy usage required beyond the chosen refueling station and in view of the then expected energy remaining for propulsion. Thereafter, the method 50 may continue to step 66.

Periodically (e.g. at desired time intervals) or after occurrence of an event, like a traffic alert or other change to the conditions along the travel path, or upon reaching a preset navigation instruction, portion of the travel path, or stop in the travel path, the method 50 may loop to step 58 or 62 (as appropriate) and estimate the energy needed for the remainder of the travel path. This may also be done if the vehicle diverts from the travel path. In this way, the system can ensure that sufficient energy remains for propulsion, and instances of insufficient energy in the vehicle 10 can be eliminated or reduced.

The term "trip" should be interpreted broadly and may include an entire trip from start to finish, or part of a trip, such as the portion remaining after completion of some part of the trip. In this way, the systems and method are not limited only to initial determination of an energy mode of the vehicle 10 before a trip begins, but to such determination as may be made any time from the start to the finish of a trip.

The methods disclosed herein may include steps that may be carried out in a different order and by systems integrated into the vehicle 10, remote devices that communicate with the vehicle 10, or both. Further, more or fewer method steps may be used in different implementations of the method, as desired. The methods and systems of the disclosure can relate to any type of vehicle, and the vehicles may be used for any purpose.

Especially with electric vehicles, and because recharging the vehicle can take considerable time and recharging stations are not as prevalent as refueling stations for combustion engines, drivers can have concerns about the range of the vehicle. Vehicle range estimations based on nominal or average driving behavior are not sufficient to estimate the actual range more aggressive drivers will obtain. More aggressive drivers tend to consume more energy for a given trip and this may further vary as a function of the type of driving performed, where, for example and without limitation, aggressive drivers may consume a greater rate of energy in stop and go and similar driving conditions requiring frequent accelerations. In view of these and other considerations, the methods and systems described herein enable driver specific energy use models or models to be generated based on the actual driving history and habits of a driver. The energy use models can be related to categories of and/or individual driving conditions. The more driving conditions a driver has already encountered, the more refined the information can be (e.g. the more categories and conditions for which data is recorded and associated with) and the better will be future energy use models and vehicle range estimations for future trips. Even if data does not exist for specific road types or conditions, other data for the driver can be used to improve the estimation for the road type or condition for which data does not exist, as a general driving style or driving characteristics can be determined based on prior vehicle operation by the driver.

With historical data for the driver, the energy use model for future trips can be estimated by, for example, comparing the new travel path and segments thereof, with historical data for the same or similar segments. This can provide a much better estimate of energy consumption in different segments of a trip, and from that the system can estimate vehicle range, and, if needed, can recommend charging/refueling stations that enable greater energy efficiency and convenience. Further, when the historical data is captured, real-time driver actions (such as speed, acceleration and steering control) can be fed into a machine learning algorithm to determine a driving style or driver behavior model. The driving styles or behavior models can be specific to different driving conditions, types of roads and the like, as noted herein. Still further, driver assistance messages and prompts can be provided as a function of a determined driving style or behavior model. By way of one example, more aggressive drivers can be warned sooner of wet or icy road conditions and the like, which can be more challenging to navigate at higher speeds and accelerations.

What is claimed is:

1. A method of providing route information to a driver, comprising:

determining a travel path for a trip to a destination;

determining segments of the travel path;

determining a driving style of a driver of the vehicle at least in part by recording vehicle dynamic parameters while the driver is operating the vehicle and associating the vehicle dynamic parameters with a travel path type on which the vehicle was traveling when the vehicle dynamic parameters occurred and wherein the travel path types include highways and city roads;

determining an energy use model for vehicle energy use along the travel path that is based in part on the driving style;

estimating propulsion energy available in vehicle;

comparing the estimated propulsion energy to the energy use model to determine if the vehicle can reach the destination with the estimated propulsion energy, and when it is determined that the vehicle cannot reach the destination with the estimated propulsion energy, determining a location of a propulsion energy station along the travel path and reachable by the vehicle as determined from the energy use model.

2. The method of claim 1 wherein the driving style is determined at least in part as a function of rate of acceleration by the driver on multiple travel path types.

3. The method of claim 2 wherein the driving style is determined as a function of rate of deceleration of the driver.

4. The method of claim 2 wherein the segments of the travel path are categorized based on travel path type within each segment.

5. The method of claim 1 wherein the driving style is determined from vehicle operation by the driver that occurred prior to the trip.

6. The method of claim 1 wherein the energy use model is based at least in part on the energy consumption model of the vehicle, the driving style and the travel path type of each segment.

7. The method of claim 1 wherein the propulsion energy available in the vehicle is estimated to include a buffer sufficient for the vehicle to travel at least 20 miles.

8. The method of claim 1 wherein the driving style is determined as a function of a vehicle energy use history when the vehicle is operated by the driver and compared to a nominal energy use model for the vehicle in the same driving conditions.

9. The method of claim 1 wherein the vehicle includes sensors responsive to vehicle dynamic parameters and the driving style determination is accomplished as a function of the output from the sensors.

10. The method of claim 9 wherein the sensors include an accelerometer having an output indicative of vehicle accelerations and a speed sensor having an output indicative of vehicle speed.

11. The method of claim 1 wherein the segments are categorized as a function of a speed limit on each road within the travel path.

12. The method of claim 10 wherein the segments are categorized as a function of one or both of a number of intersections or stops on each road within the travel path.

13. The method of claim 1 wherein the step of determining the driving style is accomplished as a function of an average rate of acceleration of the vehicle by the driver from a stopped state of the vehicle, or an average speed of the vehicle when driven by the driver compared to a speed limit for a road on which the vehicle is traveling, or both.

14. The method of claim 1 wherein the energy use model is generated by adding up estimated energy use determinations for each segment.

15. The method of claim 1 wherein the energy use model is generated at least in part as a function of an estimated traffic level in each segment when the vehicle is estimated to be traversing each segment, an estimated vehicle speed in each segment when the vehicle is estimated to be traversing each segment, a number of times the vehicle is estimated to have to stop in each segment, or a combination of two or more of these.

16. A system for determining vehicle range for a vehicle, comprising:

a supply of propulsion energy;

a sensor responsive to the level of propulsion energy remaining in the supply;

an accelerometer responsive to accelerations of the vehicle;

a speed sensor responsive to a vehicle speed;

a location sensor arranged to enable determination of the location of the vehicle as the vehicle is operated; and a control system including a processor and a computer readable memory with instructions executable by the processor to record data from the accelerometer and from the speed sensor in use of the vehicle, to associate the data with location information from the location sensor, to store the data in categories as a function of the location information and a travel path type as determined from the location information, to determine an energy use model for the vehicle based on data from prior use of the vehicle by a driver of the vehicle, and to determine a vehicle range as a function of a travel path of the vehicle and at least in part based on the stored data and the level of propulsion energy remaining in the source and wherein the system includes a navigation program including information about travel path types within the travel path and from which the data from prior use of the vehicle by the driver is associated with specific travel path types.

17. The system of claim 16 wherein the vehicle range is determined based on a nominal energy use model for the vehicle as modified by the data from prior use of the vehicle by the driver.

* * * * *